United States Patent
Socci

(10) Patent No.: US 6,830,521 B2
(45) Date of Patent: Dec. 14, 2004

(54) DIRECTING DEVICE FOR BATTERS

(76) Inventor: Roger D. Socci, 11720 Newbridge Ct., Reston, VA (US) 20191

( * ) Notice: Subject to any disclaimer, the term of this patent is extended or adjusted under 35 U.S.C. 154(b) by 0 days.

(21) Appl. No.: 10/650,833

(22) Filed: Aug. 29, 2003

(65) Prior Publication Data

US 2004/0076939 A1 Apr. 22, 2004

Related U.S. Application Data

(60) Provisional application No. 60/406,912, filed on Aug. 30, 2002.

(51) Int. Cl.[7] .............................................. A63B 69/00
(52) U.S. Cl. ...................................... 473/458; 473/451
(58) Field of Search ...................... 434/247; 273/317.6; 473/451, 453, 457, 463, 458

(56) References Cited

U.S. PATENT DOCUMENTS

| | | | | |
|---|---|---|---|---|
| 2,852,779 A | * | 9/1958 | Roessler | 2/161.2 |
| 4,098,503 A | * | 7/1978 | Antone | 473/457 |
| 4,348,023 A | * | 9/1982 | Hinson | 473/464 |
| 4,809,975 A | * | 3/1989 | Lee | 482/110 |
| 5,390,928 A | * | 2/1995 | Salini | 473/205 |
| 5,445,383 A | * | 8/1995 | Gleason, Jr. | 473/206 |
| 5,845,374 A | * | 12/1998 | Briggs | 24/442 |
| 5,898,944 A | * | 5/1999 | Vrany | 2/161.4 |
| 5,938,532 A | * | 8/1999 | Wall | 463/47.2 |
| 6,059,675 A | * | 5/2000 | Finn | 473/568 |
| 6,168,556 B1 | * | 1/2001 | Saavedra | 482/93 |
| 6,561,930 B2 | * | 5/2003 | Mabry | 473/457 |

* cited by examiner

Primary Examiner—Kurt Fernstrom
(74) Attorney, Agent, or Firm—Armstrong, Kratz, Quintos, Hanson & Brooks, LLP

(57) ABSTRACT

A baseball training device for use in improving batting skills, particularly bat directing skills while batting, the device comprising an elongated member of at least a length to extend about the wrist of a wearer and forming a loop, and a bat knob receiving member depending from the elongated member, the bat knob receiving member having a generally circular opening adapted to receive the knob of a baseball bat when the wearer of the training device swings the baseball bat.

24 Claims, 2 Drawing Sheets

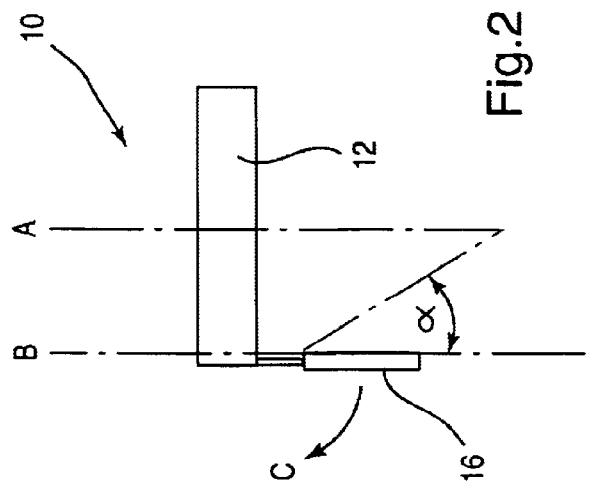
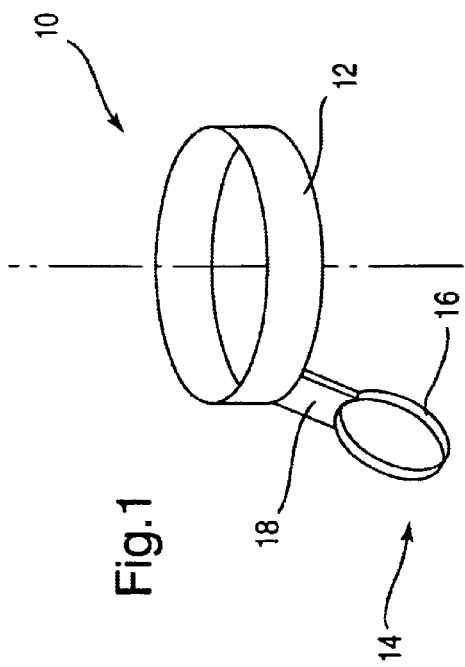
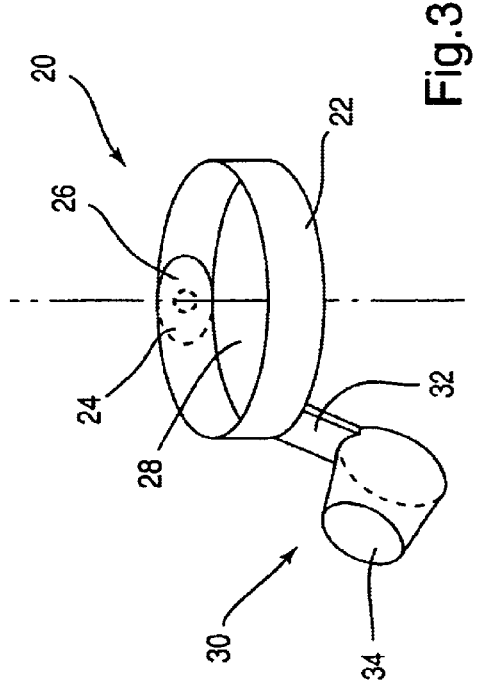

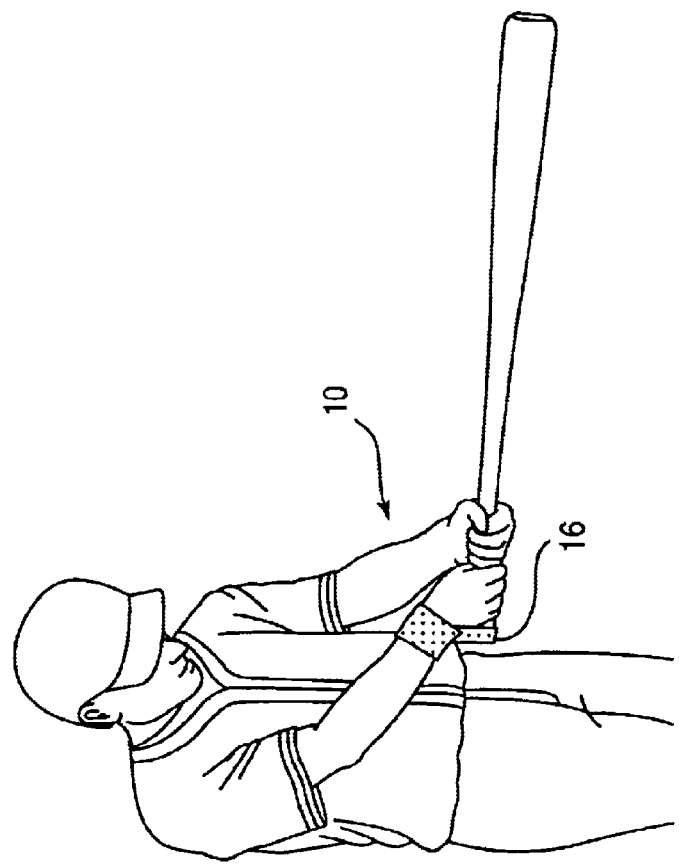
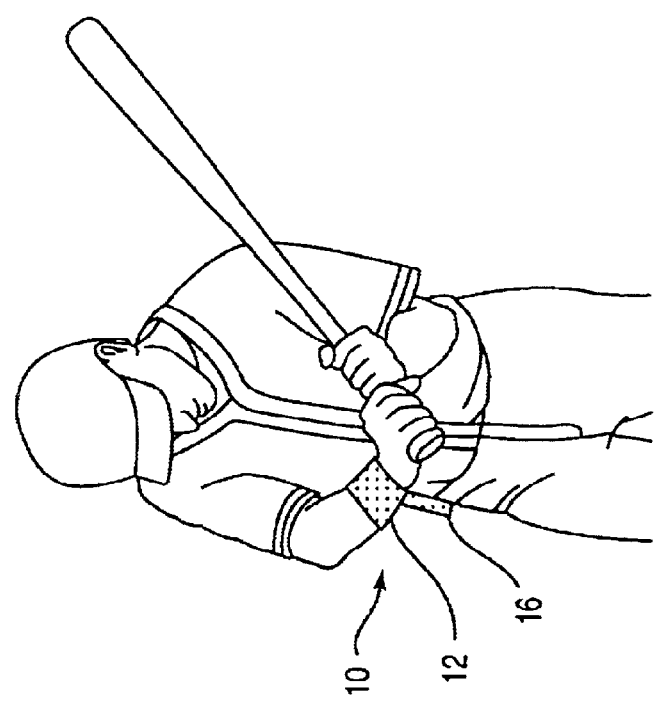

DIRECTING DEVICE FOR BATTERS

This application claims benefit of provisional application No. 60/406,912, filed Sep. 30, 2002.

The present invention relates generally to devices for assisting persons to learn sports skills and, more particularly, to devices for assisting persons to learn or improve batting skills for playing the game of baseball.

In playing baseball, a batter should always attempt to maintain the hierarchal position during the swing. Essentially, this means that the bat head or barrel of the bat is always above the hitter's hands and hitter's hands are always above the ball during the path of the bat to the ball until they are all on the same plane at contact. If a batter is able to do this, he will ensure that his bat will be in the optimum position to hit the ball. If the batter does not, the barrel of the bat and his back shoulder will drop causing the hitter to lose the hierarchal position. This will bring the bat to the ball at a bad or incorrect angle. By having the knob of the bat both move down and toward the ball, the hitter can maintain the hierarchal position during the swing. As such, wherever the knob of the bat goes, the barrel will go.

It is also desirable that the batter, when batting, maintain so-called "flat hands." Flat hands means, at contact with the ball, the palm of the bottom hand on the bat is facing downward and the palm of the top hand on the bat is facing skyward. Flat hands on contact with the baseball will enable the ball to come off the bat with backspin and no topspin. A ball with backspin will travel farther. When the hitter either prematurely rolls his wrists or rolls his wrists on contact, it also decreases extension and reduces the possibility to hit with more power. Bat speed or velocity is enhanced with a hitter contacts the ball with flat hands.

SUMMARY OF THE INVENTION

It therefore is a feature of the subject invention to provide a device for assisting persons to learn and/or improve batting skills for playing the game of baseball.

It also is a feature of the subject invention to provide a device for assisting persons to learn and/or improve "bat directing" skills when batting in the game of baseball.

It further is a feature of the subject invention to provide a device for assisting persons to learn and/or maintain "flat hands" type skills when batting in the game of baseball.

Briefly, the present invention comprehends in its broader aspects a baseball training device for use in improving batting skills, particularly bat directing skills while batting, the device comprising an elongated member of at least a length to extend about the wrist of a wearer and form a loop, and a bat knob receiving member depending from the elongated member, the bat knob receiving member having a generally circular opening adapted to receive the knob of a baseball bat when the wearer of the training device swings the baseball bat.

The present invention further comprehends a baseball training device for use in improving batting skills, particularly bat directing skills while batting, the device comprising a member of at least a length to extend about the wrist of a wearer and having two distil ends, a fastener for engaging the two distal ends of the elongated member so as to form a loop, and a bat knob receiving member depending from the elongated member, the bat knob receiving member having a generally circular opening adapted to receive the knob of a baseball bat when the wearer of the training device swings the baseball bat.

BRIEF DESCRIPTION OF THE DRAWINGS

In the drawings,

FIG. 1 is a perspective view of one embodiment of the training device in accordance with the present invention, FIG. 2 is a side view of the embodiment of the training device in accordance with the present invention shown in FIG. 1, the view illustrating the angles at which bat knob receiving member may depend from the elongated member, FIG. 3 is a perspective view of a another embodiment of the training device in accordance with the present invention, FIG. 4 is a perspective view of a baseball player wearing an embodiment of the training device in accordance with the present invention and as shown in FIG. 1, and FIG. 5 illustrates in another perspective view of a baseball player wearing the embodiment of the training device of the invention and as shown in FIG. 1, where the batter is further in the batting swing sequence from that shown in FIG. 4.

DETAILED DESCRIPTION OF THE PREFERRED EMBODIMENTS

FIG. 1 is a perspective view of one embodiment of the training device in accordance with the present invention. Baseball training device 10 is for use in improving batting skills, particularly bat directing skills while batting. Device 10 comprising an elongated member 12 of at least a length to extend about the wrist of a batter and form a loop. In this embodiment, elongated member 12 is unitary and may be made of stretchable material so as to slip onto the wrist of a batter. Alternatively, member 12 partly may be of rigid material such as a polymer or the like and the remainder of stretchable material.

Device 10 further includes bat knob receiving member 14 depending from elongated member 12. In this embodiment, bat knob receiving member 14 includes a generally circular opening in ring 16 affixed to elongated member 12 by flange 18. The generally circular opening in ring 16 is of a size to receive the knob of a baseball bat when the wearer of the training device swings the baseball bat.

The side view of device 10 as shown in FIG. 2 illustrates the orientation of the ring 16 relative to the elongated member 12. As shown, the ring 16 depends from member 12 along a line B generally parallel to the central axis A of the member. It may however be advantageous to have the plane of ring 16 extend inwardly toward the central axis by an angle alpha to facilitate operation of device 10. Angle alpha can be up to 30 degrees or more.

It may also be advantageous that ring 16 by the manner of its connection to elongated member 12 by flange 18, can swing in the direction C upon contact with the knob of the baseball bat so as to allow for a turning motion such that the swing can be smoothly completed. This swinging motion of ring 16 can be accomplished by a pivot, hinge, the semi-flexible nature of flange and/or the elongated member and the like. However, ring 16 should be biased such that it is in the proper position as shown in FIG. 2 to receive the knob of the bat at initial contact.

In the embodiment of the invention as shown in FIG. 3, the device 20 comprising a member 22 of at least a length to extend about the wrist of a wearer and having two distil ends 24 and 26. Fastener 28 is provided for engaging the two distal ends 24 and 26 of the elongated member 22 so as to form a loop. Fastener 28 may be, for example, a buckle, snap, clip, hook-and-loop or other type of fastener.

As in the above embodiment, device 20 includes a bat knob receiving member 30 depending from the elongated member by flange 32. The bat knob receiving member 30 includes a receptacle 34 having a generally circular opening adapted to receive the knob of a baseball bat when the wearer of the training device swings the baseball bat. In this embodiment, bat knob receiving member 30 includes closed receptacle 34 such that the batter positively is aware that the bat knob has been received.

It is contemplated that the training devices in accordance with the present invention further may include a signal device (not shown) in connection with the opening adapted to receive the knob of the baseball bat to provide a positive indication in the form of a signal that the knob has been received. The signal device may generate a audible sound and/or a visual indication. The signal can be generated by mechanical and/or electrical devices such clickers, buzzers, lights and the like.

Referring now to the use of the subject devices to train a batter, FIGS. 4 and 5 show the sequence of a batter in generating a swing in order to hit a baseball. Device 10 is mounted on the bottom hand wrist of the batter with knob receiving member 14 extending downwardly. In the position shown in FIG. 4, the batter has commenced the swing. In the position shown in FIG. 5, the batter has reached the point in the swing such that the knob of the baseball bat is received in the circular opening in ring 16 so as to signal to the batter that the swing has been conducted with the above-discussed principles.

The batting device as disclosed herein facilitates two distinct movements required for correct and effective hitting. The downward direction of the bat, which maintains the hierarchal position of the bat in the swing and flat hands that minimizes the rolling of the batter's wrists, will become possible training with the device. The turning motion is the gradual horizontal leveling of the bat from the downward semi-vertical position of the bat. If the batter keeps the knob moving downward on the swing, he will maintain the proper angle from the semi-vertical bat position to the horizontal bat position (turning motion) and allow for the proper "docking" of the bat's knob in the designated receptacle on the device. If the batter raises the knob of the bat anytime before a level swing or the bat turns in his hands because he rolled his wrists even on a level swing, proper "docking" will not be possible. When this happens, a batter knows he is either rolling his wrists prematurely, at contact on the swing or raising the knob on the bat and losing the hierarchy.

While there has been shown and described what are considered to be preferred embodiments of the present invention, it will be apparent to those skilled in the art to which the invention pertains that various changes and modifications may be made therein without departing from the invention as defined in the appended claims.

It is claimed:

1. A baseball training device for use in improving batting skills, the device comprising an elongated member of at least a length to extend about the wrist of a wearer and form a loop, and a bat knob receiving member depending from the elongated member, the bat knob receiving member having a generally circular opening adapted to receive the knob of a baseball bat when the wearer of the training device swings the baseball bat, the device further including a signal device in connection with the opening adapted to receive the knob of the baseball bat to provide a positive indication in the form of a signal that the knob has been received.

2. A baseball training device according to claim 1, wherein the elongated member is unitary and is made of stretchable material so as to slip onto the wrist of a batter.

3. A baseball training device according to claim 1, wherein the elongated member partly is of rigid material and the remainder is of stretchable material.

4. A baseball training device according to claim 1, wherein the bat knob receiving member includes a generally circular opening in a ring affixed to elongated member by flange.

5. A baseball training device according to claim 4, wherein the ring is connected to elongated member by the flange such that the ring can swing upon contact with the knob of the baseball bat so as to allow for a turning motion.

6. A baseball training device according to claim 1, wherein the bat knob receiving member depends from the elongated member by flange, the bat knob receiving member including a receptacle having a generally circular opening adapted to receive the knob of a baseball bat when the wearer of the training device swings the baseball bat.

7. A baseball training device according to claim 6, wherein the bat knob receiving member includes a closed receptacle.

8. A baseball training device for use in improving batting skills, the device comprising a member of at least a length to extend about the wrist of a wearer and having two distil ends, a fastener for engaging the two distal ends of the elongated member so as to form a loop, and a bat knob receiving member depending from the elongated member, the bat knob receiving member having a generally circular opening adapted to receive the knob of a baseball bat when the wearer of the training device swings the baseball bat, the device further including a signal device in connection with the opening adapted to receive the knob of the baseball bat to provide a positive indication in the form of a signal that the knob has been received.

9. A baseball training device according to claim 8, wherein the elongated member is unitary and is made of stretchable material so as to slip onto the wrist of a batter.

10. A baseball training device according to claim 8, wherein the elongated member partly is of rigid material and the remainder is of stretchable material.

11. A baseball training device according to claim 8, wherein the bat knob receiving member includes a generally circular opening in a ring affixed to elongated member by flange.

12. A baseball training device according to claim 11, wherein the ring is connected to elongated member by the flange such that the ring can swing upon contact with the knob of the baseball bat so as to allow for a turning motion.

13. A baseball training device according to claim 8, wherein the bat knob receiving member depends from the elongated member by flange, the bat knob receiving member including a receptacle having a generally circular opening adapted to receive the knob of a baseball bat when the wearer of the training device swings the baseball bat.

14. A baseball training device according to claim 13, wherein the bat knob receiving member includes a closed receptacle.

15. A baseball training device for use in improving batting skills, the device comprising a member of at least a length to extend about the wrist of a wearer and having two distil ends, a fastener for engaging the two distal ends of the elongated member so as to form a loop, and a bat knob receiving member depending from the elongated member by a flange, the bat knob receiving member including a closed receptacle having a generally circular opening adapted to receive the knob of a baseball bat when the wearer of the training device swings the baseball bat.

16. A baseball training device according to claim 15, wherein the elongated member 12 is unitary and is made of stretchable material so as to slip onto the wrist of a batter.

17. A baseball training device according to claim 15, wherein the elongated member 12 partly is of rigid material and the remainder is of stretchable material.

18. A baseball training device according to claim 15, wherein the bat knob receiving member includes a generally circular opening in a ring affixed to elongated member by flange.

19. A baseball training device according to claim 18, wherein the ring is connected to elongated member by the flange such that the ring can swing upon contact with the knob of the baseball bat so as to allow for a turning motion.

20. A baseball training device for use in improving batting skills, the device comprising an elongated member of at least a length to extend about the wrist of a wearer and form a loop, and a bat knob receiving member depending from the elongated member by a flange, the bat knob receiving member having a closed receptacle having a generally circular opening adapted to receive the knob of a baseball bat when the wearer of the training device swings the baseball bat.

21. A baseball training device according to claim 20, wherein the elongated member is unitary and is made of stretchable material so as to slip onto the wrist of a batter.

22. A baseball training device according to claim 20, wherein the elongated member partly is of rigid material and the remainder is of stretchable material.

23. A baseball training device according to claim 20, wherein the bat knob receiving member includes a generally circular opening in a ring affixed to elongated member by flange.

24. A baseball training device according to claim 23, wherein the ring is connected to elongated member by the flange such that the ring can swing upon contact with the knob of the baseball bat so as to allow for a turning motion.

* * * * *